(12) United States Patent
Zheng et al.

(10) Patent No.: US 8,879,575 B2
(45) Date of Patent: Nov. 4, 2014

(54) NETWORK TRANSCEIVER AND BANDWIDTH MANAGEMENT METHOD THEREOF

(75) Inventors: Ching-Huei Zheng, Tainan (TW); Shen-Ming Chung, Minxiong Township, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 351 days.

(21) Appl. No.: 13/209,217

(22) Filed: Aug. 12, 2011

(65) Prior Publication Data

US 2012/0281618 A1   Nov. 8, 2012

(30) Foreign Application Priority Data

May 5, 2011   (TW) .............................. 100115844 A

(51) Int. Cl.
  *H04J 3/16*   (2006.01)
  *H04L 12/54*   (2013.01)
(52) U.S. Cl.
  CPC ................................ *H04L 12/5601* (2013.01)
  USPC .......................................... 370/468; 370/429
(58) Field of Classification Search
  USPC .............. 370/395.1, 395.4–395.43, 412–418, 370/428, 429, 468
  See application file for complete search history.

(56) References Cited

U.S. PATENT DOCUMENTS

| | | | |
|---|---|---|---|
| 6,381,647 B1 * | 4/2002 | Darnell et al. ................ | 370/320 |
| 6,570,883 B1 | 5/2003 | Wong | |
| 7,813,371 B2 | 10/2010 | McNew et al. | |
| 2003/0091067 A1 * | 5/2003 | Emerson et al. .............. | 370/473 |
| 2006/0224737 A1 | 10/2006 | Cho et al. | |
| 2006/0230146 A1 | 10/2006 | Wang et al. | |
| 2006/0230147 A1 | 10/2006 | Cho et al. | |

FOREIGN PATENT DOCUMENTS

WO   WO 95/29576   11/1995

OTHER PUBLICATIONS

Kamal, A.E.; "A Scheme for the Management of Isochronous and Asynchronous Bandwidth in Ring Networks;" IEEE; 1994; pp. 1398-1407.
Huang, N.F., et al., "On the Isochronous and Asynchronous Traffic Scheduling Problem for Single-Star WDM Networks;" IEEE; 1996; pp. 1766-1770.
Carmo, R.L.R., et al.; "Real-Time Communication Services in a DQDB Network;" IEEE; 1994; pp. 249-258.
Wang, S.Y., et al.; "Improving the Channel Utilization of IEEE 802.11p/1609 Networks;" IEEE; 2009; pp. 1-6.

* cited by examiner

*Primary Examiner* — Pao Sinkantarakorn
(74) *Attorney, Agent, or Firm* — McClure, Qualey & Rodack, LLP

(57) ABSTRACT

A loop method for determining transmission orders of asynchronous packets includes the steps of: classifying the asynchronous packets into a number of groups according to their lengths; and judging whether a length of a packet belonging to a longest-length packet group is smaller than or equal to a remained bandwidth of an asynchronous transmission period. If yes, the packet is transmitted in the asynchronous transmission period and the step is repeated to transmit other packets of the longest-length packet group. If not, it is judged whether a length of a packet belonging to a second-longest-length packet group is smaller than or equal to the remained bandwidth of the asynchronous transmission period to transmit the packets of the second-longest-length packet group. These steps are repeated until a shortest-length packet group is greater than the remained bandwidth.

9 Claims, 6 Drawing Sheets

NETWORK TRANSCEIVER AND BANDWIDTH MANAGEMENT METHOD THEREOF

This application claims the benefit of Taiwan application Serial No. 100115844, filed May 5, 2011, the subject matter of which is incorporated herein by reference.

BACKGROUND

1. Technical Field

The disclosure relates in general to a bandwidth management method, and more particularly to a bandwidth management method applied to an isochronous network transceiver to enhance the network efficiency, and a network transceiver using the same.

2. Description of the Related Art

In the modern age, in which the technology development is changing with each passing day, an isochronous stream network transmission mechanism has been developed to perform the real-time transmission on a data packet, such as multimedia audio-video data, which is more sensitive to the transmission time. Generally speaking, most of the existing isochronous stream transmission mechanisms follow the isochronous packet transmission standard, specified by the IEEE 802.1 AV Bridging Task Group (IEEE 802.1 AVB) to firstly divide the bandwidth with every 125 µs serving as one cycle, then to specify the front 75% and the rear 25% of each transmission cycle into an isochronous packet and an asynchronous packet transmission period, and to perform transmission operations in the isochronous packet and the asynchronous packet, respectively.

According to the property of the isochronous network, the isochronous transmission period occupies at most 75% of the total bandwidth, and the remained bandwidth is the asynchronous packet transmission period. So, the length of the bandwidth is not constant, and the length of the asynchronous packet is variable, thereby wasting the asynchronous bandwidth. Thus, it is an important subject in the industry to design a better bandwidth management method according to the asynchronous packet transmission operation.

SUMMARY

The disclosure is directed to a bandwidth management method and an isochronous network transceiver using the same, which have the advantages of effectively enhancing the asynchronous bandwidth usage.

According to a first aspect of the present disclosure, a network transceiver disposed in a network environment is provided. The network transceiver includes a receiving unit, an exchanging unit and a transmission unit. The receiving unit receives asynchronous packets and isochronous packets. The exchanging unit performs an exchanging operation on the asynchronous packets and the isochronous packets. The transmission unit receives and provides the asynchronous packets and the isochronous packets to a transmission target end. The transmission unit includes a timing control circuit and an asynchronous transmission logic circuit. The timing control circuit divides a transmission period into an asynchronous transmission period and an isochronous transmission period. The asynchronous transmission logic circuit determines a transmission order of each of the asynchronous packets according to packet length information of the asynchronous packets, and further outputs the asynchronous packets according to remained bandwidth information in the asynchronous transmission period and according to the transmission order of each of the asynchronous packets.

According to a second aspect of the present disclosure, a bandwidth management method, applied to a network transceiver, for transmitting asynchronous packets and isochronous packets, is provided. The bandwidth management method includes the following steps. First, a transmission period is divided into an asynchronous transmission period and an isochronous transmission period. Then, the isochronous packets are outputted in the isochronous transmission period. Next, a remained bandwidth of the asynchronous transmission period is determined according to remained bandwidth information. Then, a transmission order of each of the asynchronous packets is determined according to packet length information of each of the asynchronous packets. Finally, the asynchronous packets are outputted in the asynchronous transmission period according to a transmission priority order of each of the asynchronous packets.

The above and other aspects of the disclosure will become better understood with regard to the following detailed description of the non-limiting embodiment(s). The following description is made with reference to the accompanying drawings.

DETAILED DESCRIPTION

Figure 1:
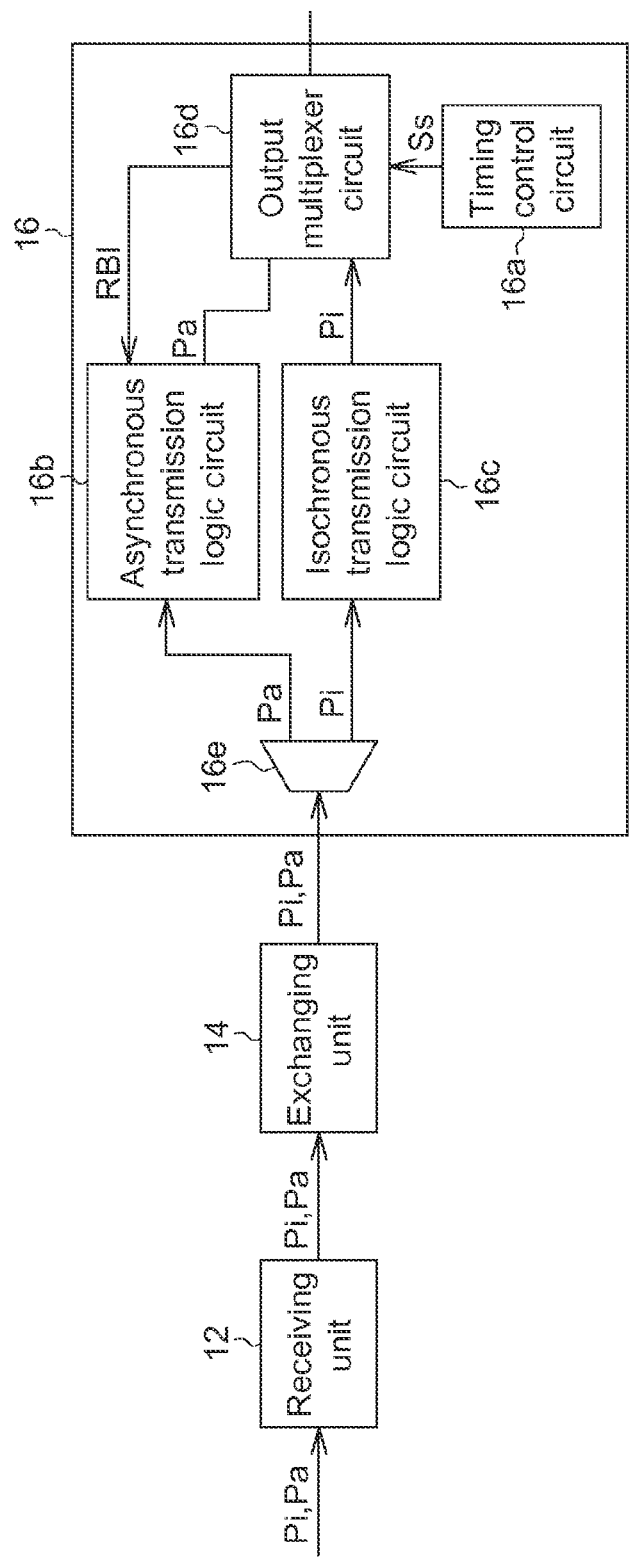
FIG. 1 is a block diagram showing a network transceiver according to an embodiment of this disclosure.

FIG. 1 is a block diagram showing a network transceiver 1 according to an embodiment of this disclosure. As shown in FIG. 1, the network transceiver 1 is disposed in a network environment to perform transmission operations on signals between a signal-source-end device and a target-end device. The network transceiver 1 includes a receiving unit 12, an exchanging unit 14 and a transmission unit 16. The receiving unit 12 receives several asynchronous packets Pa and several isochronous packets Pi. In this example embodiment, the network transceiver 1 includes one receiving unit 12 and one transmission unit 16. However, the network transceiver 1 of this embodiment is not restricted thereto. In other examples, the network transceiver 1 may also include two or more than two receiving units and transmission units.

The exchanging unit 14 manages the corresponding relationships of the packet transmission between the receiving units and the transmission units when the network transceiver 1 contains several receiving units or several transmission units.

The transmission unit 16 receives the asynchronous packets Pa and the isochronous packets Pi, provided by the exchanging unit 14, and provides the asynchronous packets Pa and the isochronous packets Pi to the transmission target-end device. For example, the transmission unit 16 includes a timing control circuit 16a, an asynchronous transmission logic circuit 16b, an isochronous transmission logic circuit 16c, an output multiplexer circuit 16d and a demultiplexer circuit 16e.

The demultiplexer circuit 16e provides the asynchronous packets Pa and the isochronous packets Pi, provided by the exchanging unit 14, to the asynchronous transmission logic circuit 16b and the isochronous transmission logic circuit 16c, respectively. The isochronous transmission logic circuit 16c outputs the isochronous packet Pi in the isochronous transmission period Ti.

Figure 2:
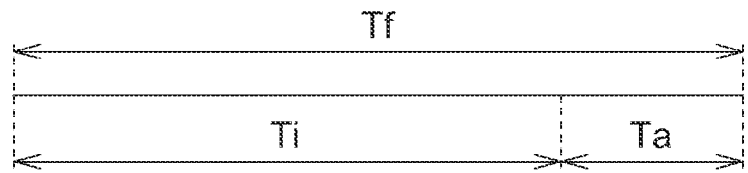
FIG. 2 shows operation timings of the network transceiver according to the embodiment of this disclosure.

The timing control circuit 16a determines a transmission period Tf and provides a transmission-cycle-start signal Ss to indicate a start time point of the transmission period Tf. The timing control circuit 16a further divides the transmission period Tf into an asynchronous transmission period Ta and the isochronous transmission period Ti. For example, the packet transmission operation of the network transceiver 1 of this embodiment satisfies the isochronous packet transmission standard specified by IEEE 802.1 AV Bridging Task Group (IEEE 802.1 AVB). Accordingly, a frame period Tf of the network transceiver 1 is equal to 125 microseconds (µs), wherein the isochronous transmission period Ti corresponding to the isochronous packet transmission occupies about at most 75% of the frame period Tf, and the asynchronous transmission period Ta corresponding to the asynchronous packet transmission occupies about at least 25% of the frame period. That is, the periods Tf and Ta are equal to about 93.75 µs and 31.25 µs, respectively, as shown in FIG. 2.

The asynchronous transmission logic circuit 16b determines the transmission order of each asynchronous packet Pa according to the packet length information of each asynchronous packet Pa. The asynchronous transmission logic circuit 16b further outputs the asynchronous packets Pa according to the transmission order of each asynchronous packet Pa in the asynchronous transmission period Ta and according to the remained bandwidth information RBI.

Figure 3:
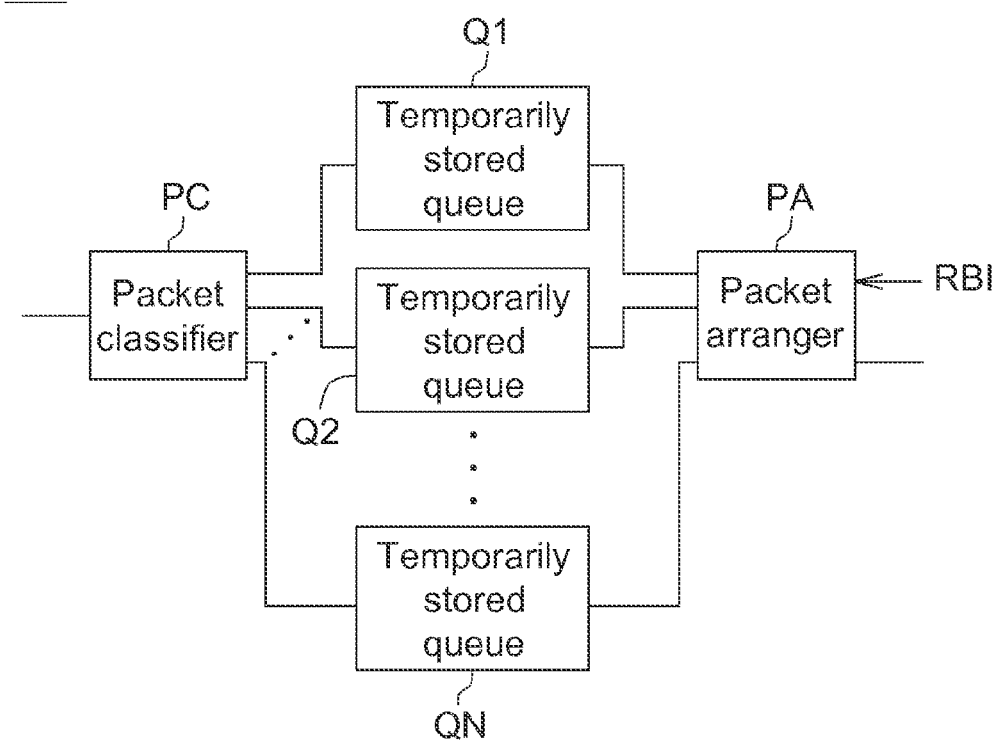
FIG. 3 is a detailed block diagram showing an asynchronous transmission logic circuit 16b of FIG. 1.

FIG. 3 is a detailed block diagram showing the asynchronous transmission logic circuit 16b of FIG. 1. For example, the asynchronous transmission logic circuit 16b includes N temporarily stored queues Q1, Q2, . . . , QN, a packet classifier PC and a packet arranger PA, wherein N is a natural number greater than 1. The packet classifier PC classifies the asynchronous packets Pa into N packet subsets Set_1, Set_2, . . . , Set_N according to the packet length condition, and respectively stores the N packet subsets Set_1 to Set_N to the temporarily stored queues Q1 to QN, wherein the N packet subsets Set_1 to Set_N respectively correspond to N transmission orders.

For example, the remained bandwidth corresponding to the asynchronous transmission period Ta is represented by the remained bandwidth Ba. The packet arranger PA sequentially registers the asynchronous packet registers of the N packet subsets Set_1 to Set_N to the remained bandwidth Ba according to the N transmission orders, and thus to transmit the N packet subsets Set_1 to Set_N in the asynchronous transmission period Ta.

Figure 4:
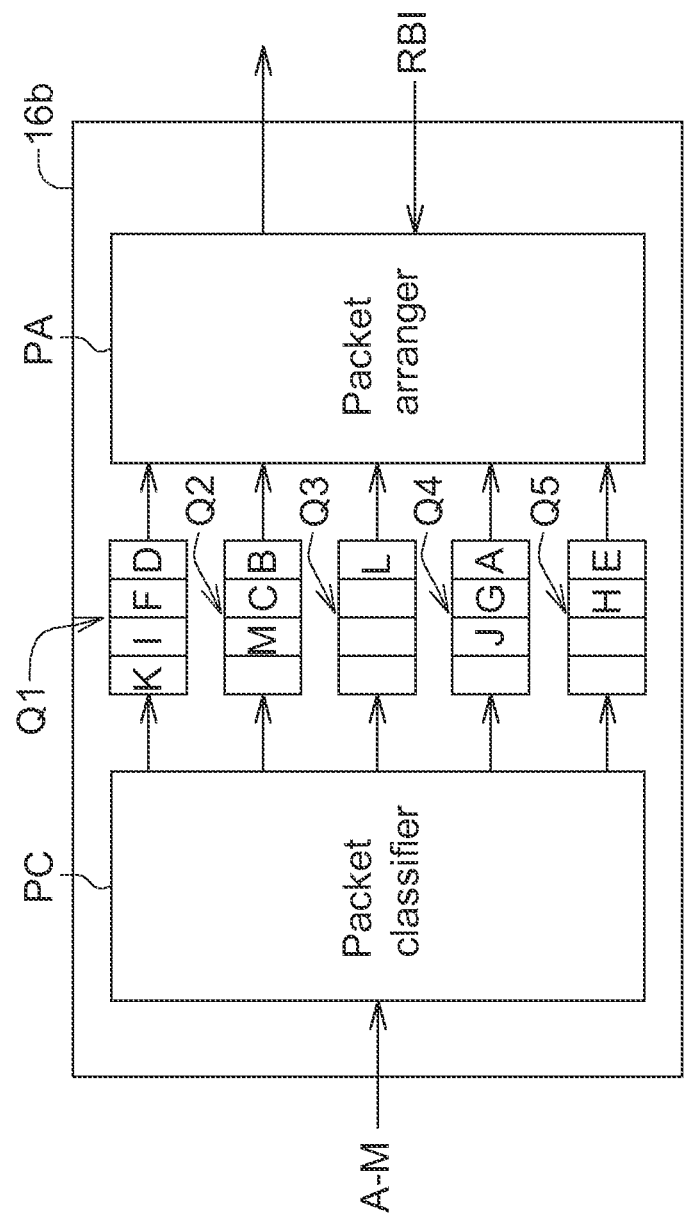
FIG. 4 is a schematic illustration showing operations of the asynchronous transmission logic circuit according to the embodiment of this disclosure.

FIGS. 4 and 5 are respectively a schematic illustration and operation timing charts showing operations of the asynchronous transmission logic circuit according to the embodiment of this disclosure. In one operation example, N is equal to 5, and the following five packet length ranges L1 (64 to 127 bytes), L2 (128 to 255 bytes), L3 (256 to 511 bytes), L4 (512 to 1023 bytes) and L5 (over 1024 bytes) are determined according to the packet length condition. The packet classifier PC respectively classifies the asynchronous packets, having the packet lengths falling within the packet length ranges L1 to L5, into the packet subsets Set_1 to Set_N (N=5) according to the packet length information of each asynchronous packet Pa.

In the example of FIG. 4, the packet classifier PC sequentially receives the asynchronous packets A to M, wherein the asynchronous packets H and E correspond to the packet length range L5, the asynchronous packets J, G and A correspond to the packet length range L4, the asynchronous packet L corresponds to the packet length range L3, the asynchronous packets M, C and B correspond to the length range L2, and the asynchronous packets K, I, F and D correspond to the packet length range L1. Therefore, the packet classifier PC stores the asynchronous packets A to M, corresponding to each of the packet length ranges L1 to L5, to the corresponding temporarily stored queues Q1 to Q5, respectively. The packet subsets Set_5 to Set_1 correspond to the first (highest) transmission order, the second transmission order, the third transmission order, the fourth transmission order and the fifth transmission order, respectively.

The packet arranger PA finds the remained bandwidth Ba of the asynchronous transmission period Ta in the current frame period Tf according to the remained bandwidth information RBI, and arranges the transmission operation of each of the packet subsets Set_1 to Set_5 in the asynchronous transmission period Ta according to the transmission orders of the packet subsets Set_1 to Set_5 and the packet receiving order of each of the packet subsets Set_1 to Set_5.

More specifically, after the remained bandwidth Ba of the asynchronous transmission period Ta is found, the packet arranger PA sequentially determines whether to arrange the transmission operation of each of the asynchronous packets A to M in the asynchronous transmission period Ta through a loop operation and the following order: E, H, A, G, J, L, B, C, M, D, F, I and K (i.e., the transmission orders of the packet subsets Set_1 to Set_5 are firstly referred, and then the data receiving order of each of the packet subsets Set_1 to Set_5 is referred).

Figure 5A:
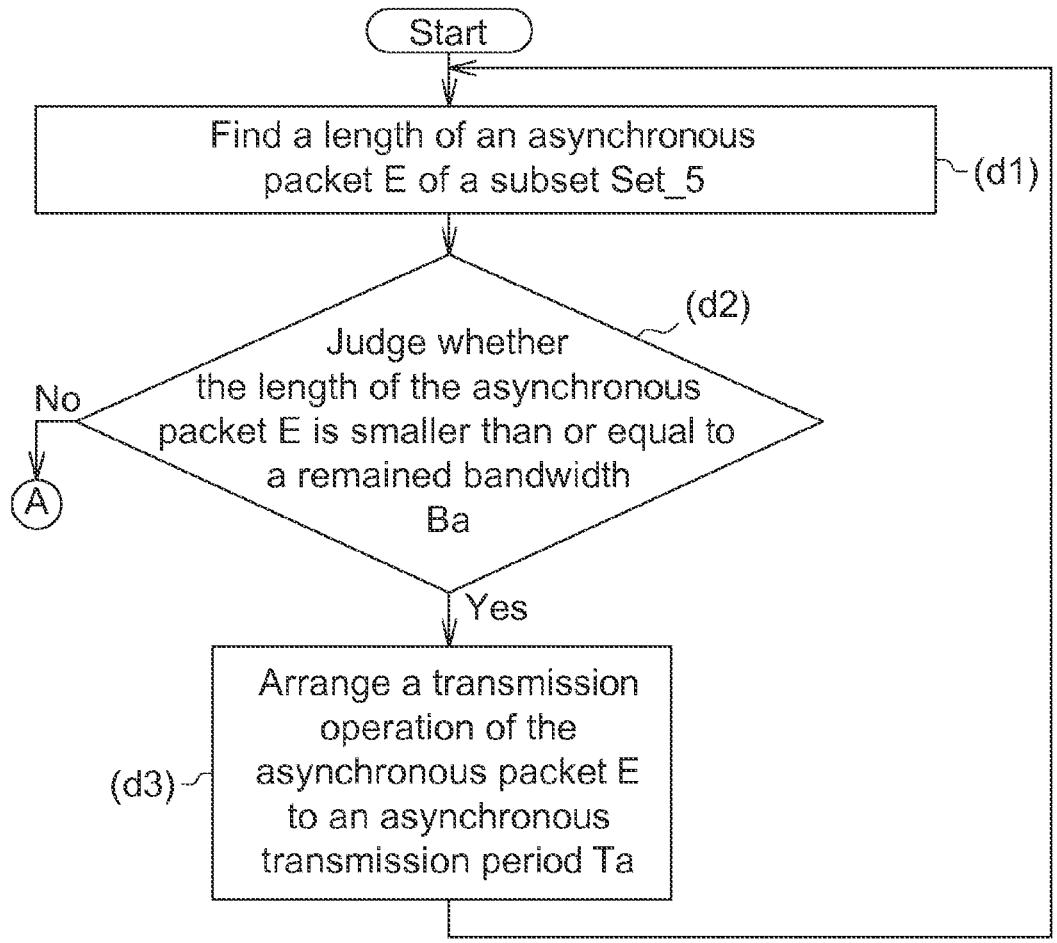
FIGS. 5A and 5B are flow charts showing a loop operation performed by a packet arranger PA.
Figure 6:
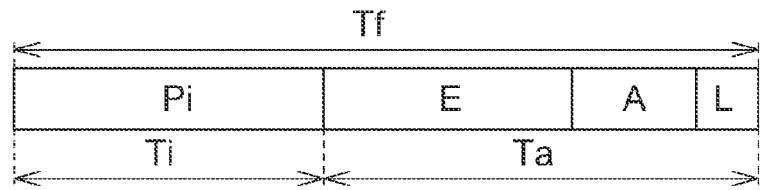
FIG. 6 shows operation timings of the asynchronous transmission logic circuit according to the embodiment of this disclosure.

FIG. 5A is a flow chart showing the loop operation performed by the packet arranger PA. As shown in step (d1), the length of the first asynchronous packet E of the subset Set_5 (corresponding to the highest transmission order) is found. As shown in step (d2), it is judged whether the length of the first asynchronous packet E of the subset Set_5 (corresponding to the highest transmission order) is smaller than or equal to the remained bandwidth Ba. If yes, step (d3) is performed, in which the packet arranger PA arranges the transmission operation of the asynchronous packet E in the asynchronous transmission period Ta, and subtracts the length of the asynchronous packet E from the remained bandwidth Ba to obtain an updated remained bandwidth Ba', as shown in FIG. 6.

Thereafter, the packet arranger PA repeats the step (d1), and the packet arranger PA judges whether the length of the second asynchronous packet H of the subset Set_5 is smaller than or equal to the updated remained bandwidth Ba'. If not, the process jumps out of the loop operation of the steps (d1) to (d3).

Figure 5B:
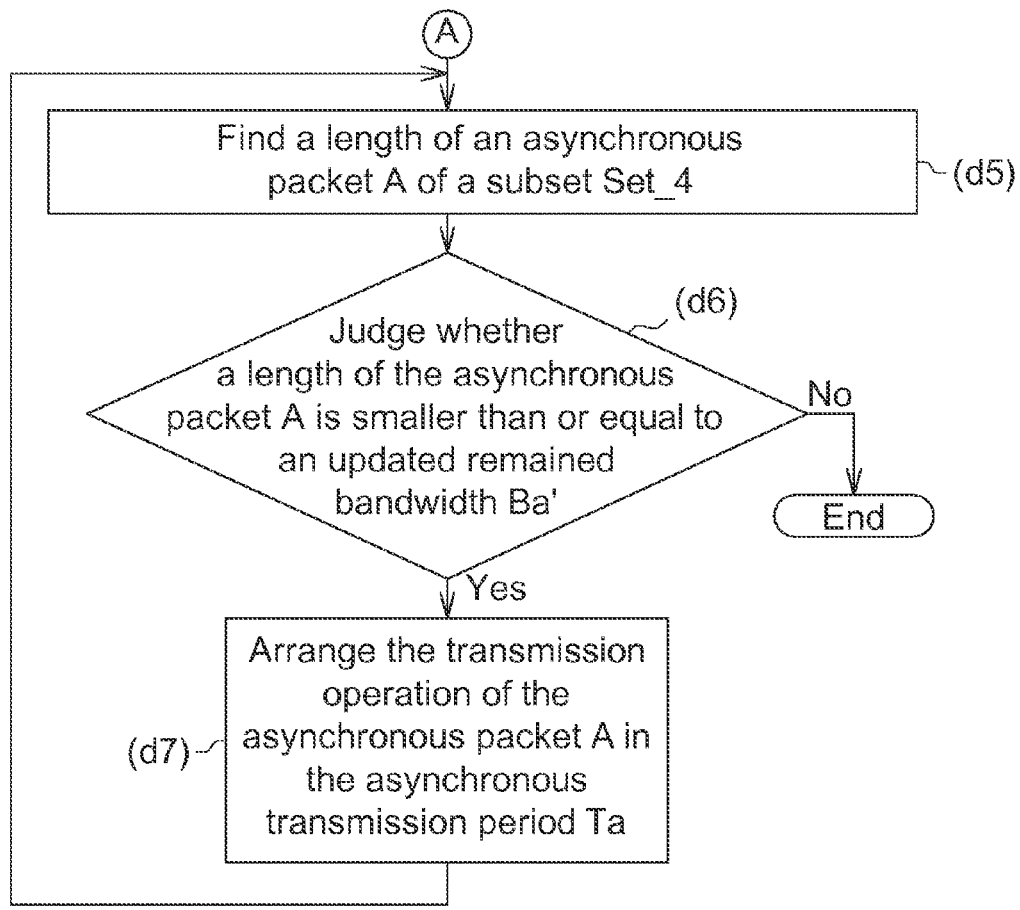

FIG. 5B is a flow chart showing the loop operation performed by the packet arranger PA. After jumping out of the loop operation of the steps (d1) to (d3), the packet arranger PA further performs the loop operation of the steps (d5) to (d7) to perform the transmission arrangement on each of the asynchronous packets A, G and J of the subset Set_4. As shown in the step (d5), the length of the first asynchronous packet A of the subset Set_4 (corresponding to the second highest transmission order) is found. As shown in the step (d6), it is judged whether the length of the asynchronous packet A is smaller than or equal to the updated remained bandwidth Ba'. If yes, the step (d7) is performed, and the packet arranger PA arranges the transmission operation of the asynchronous packet A in the asynchronous transmission period Ta, and subtracts the length of the asynchronous packet A from the updated remained bandwidth Ba' to obtain the updated remained bandwidth Ba". Thereafter, the packet arranger PA repeats the step (d5).

Accordingly, the operations of the packet arranger PA in the asynchronous transmission period may be analogized according to the above-mentioned descriptions, and detailed descriptions thereof will be omitted.

The output multiplexer circuit 16d outputs the isochronous packet Pi and the asynchronous packet Pa in the isochronous transmission period Ti and the asynchronous transmission period Ta, respectively, and further provides the remained bandwidth information RBI to indicate the remained bandwidth Ba of the asynchronous transmission period Ta.

In this embodiment, although only the example condition, in which the packet classifier PC determines the transmission order of each asynchronous packet Pa according to the packet length information of each asynchronous packet Pa, is described, the packet classifier PC of this embodiment is not limited thereto. In another example, the packet classifier PC performs the operation of classifying the asynchronous packet Pa into the N packet subsets Set_1 to Set_N according to the transmission-priority-order label information ltg of each asynchronous packet Pa.

For example, once the transmission-priority-order label information ltg of the asynchronous packet Pa, indicating that it has the highest transmission priority order, is received, the packet classifier PC classifies the packets to the packet subset (e.g., the packet subset Set_5 stored in the temporarily stored queue Q5 in FIG. 4) corresponding to the highest transmission order to ensure that it has the higher transmission order.

Figure 7:
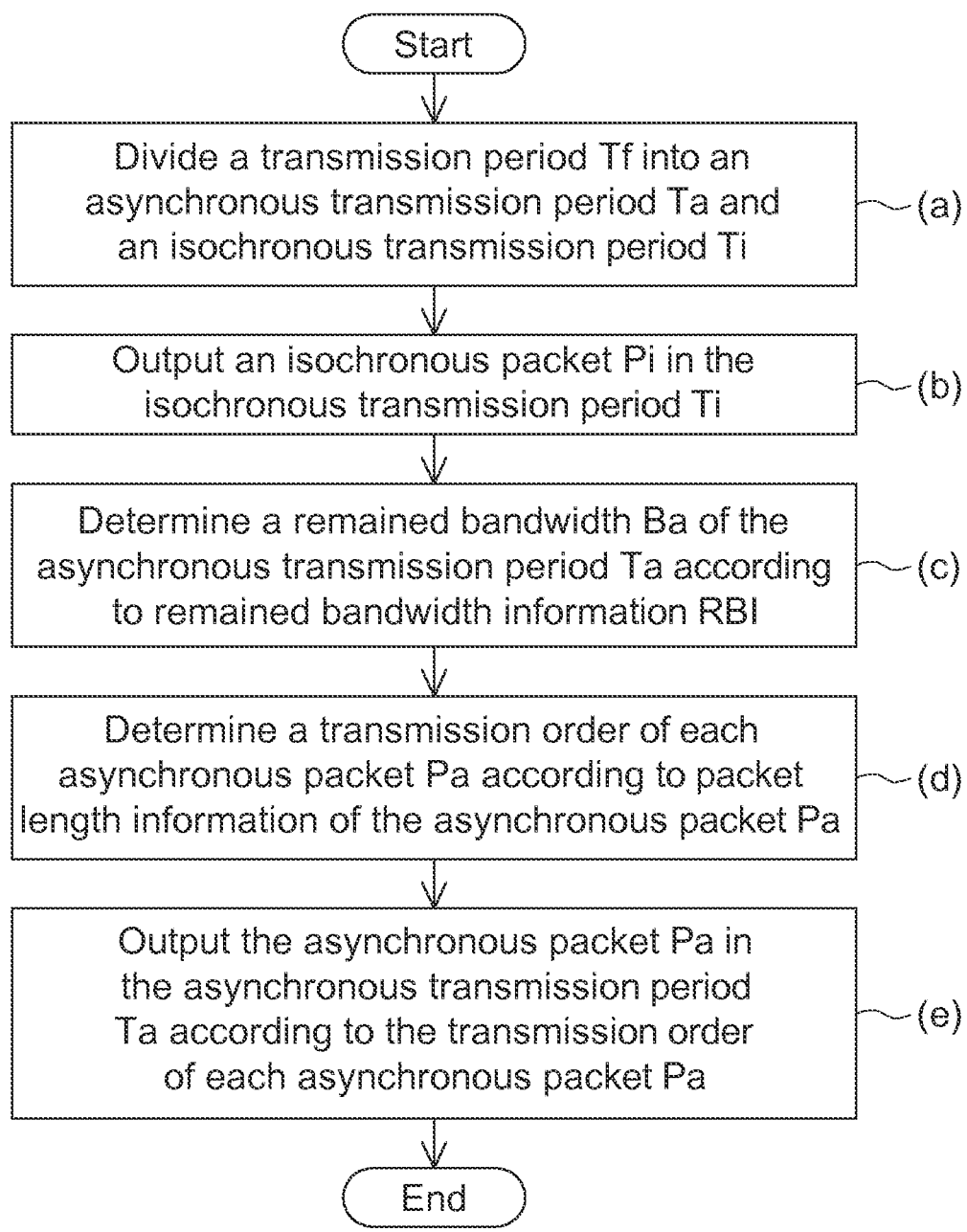
FIG. 7 is a flow chart showing a bandwidth management method according to the embodiment of this disclosure.

FIG. 7 is a flow chart showing a bandwidth management method according to the embodiment of this disclosure. The bandwidth management method is applied to the network transceiver 1 to transmit the several asynchronous packets Pa and the several isochronous packets Pi and includes the following steps. First, as shown in step (a), the timing control circuit 16a divides the transmission period Tf into the asynchronous transmission period Ta and the isochronous transmission period Ti. Next, as shown in step (b), the isochronous transmission logic circuit 16c outputs the isochronous packet Pi in the isochronous transmission period Ti.

Then, as shown in step (c), the asynchronous transmission logic circuit 16b determines the remained bandwidth Ba of the asynchronous transmission period Ta according to the remained bandwidth information RBI. Next, as shown in step (d), the asynchronous transmission logic circuit 16b determines the transmission order of each asynchronous packet Pa according to the packet length information of the asynchronous packet Pa. The asynchronous transmission logic circuit 16b determines the transmission order of the asynchronous packet Pa through the steps (d1) to (d7) in FIG. 5.

Thereafter, as shown in step (e), the asynchronous transmission logic circuit 16b outputs the asynchronous packet Pa according to the transmission order of each asynchronous packet Pa in the asynchronous transmission period Ta.

The network transceiver of this embodiment utilizes the packet classifier in the asynchronous transmission logic circuit to divide the packets into several packet subsets corresponding to different transmission orders according to the packet length information of each asynchronous packet. The network transceiver of this embodiment further utilizes the packet arranger in the asynchronous transmission logic circuit to sequentially arrange the transmission operation of the asynchronous packet of each packet subset in the remained bandwidth of the asynchronous transmission sub-period according to the transmission order of each packet subset. Therefore, compared with the conventional network transceiver, the network transceiver and the bandwidth management method of this embodiment have the advantages of preventing the bandwidth availability of the asynchronous transmission period from being wasted to become poor, and of effectively enhancing the bandwidth usage of the network.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A network transceiver, disposed in a network environment, the network transceiver comprising:
   a receiving unit for receiving a plurality of asynchronous packets and a plurality of isochronous packets;
   an exchanging unit for performing an exchanging operation on the asynchronous packets and the isochronous packets; and
   a transmission unit for receiving and providing the asynchronous packets and the isochronous packets to a transmission target end, the transmission unit comprising:
   a timing control circuit for dividing a transmission period into an asynchronous transmission period and an isochronous transmission period; and
   an asynchronous transmission logic circuit for determining a transmission order of each of the asynchronous packets according to packet length information of the asynchronous packets, and further outputting the asynchronous packets according to remained bandwidth information in the asynchronous transmission period and according to the transmission order of each of the asynchronous packets, the asynchronous transmission logic circuit comprising:
   N temporarily stored queues, wherein N is a natural number greater than 1;
   a packet classifier for classifying the asynchronous packets into N packet subsets according to a plurality of packet length conditions and respectively storing the N packet subsets to the temporarily stored queues, wherein the N packet subsets respectively correspond to N transmission orders; and
   a packet arranger for sequentially registering the asynchronous packets of the N packet subsets into a remained bandwidth according to the N transmission orders.

2. The network transceiver according to claim 1, wherein the packet classifier performs the operation of classifying the asynchronous packets into the N packet subsets further according to transmission-priority-order label information of each of the asynchronous packets.

3. The network transceiver according to claim 1, wherein the packet arranger performs the following operations to arrange a transmission operation of each of the asynchronous packets of the N packet subsets:
   (A) selecting a packet subset of the N packet subsets with a corresponding $j^{th}$ transmission order, the packet subset of the $j^{th}$ transmission order comprising M asynchronous packets, wherein j is a natural number with a start value of 1 and is smaller than or equal to N, and M is a natural number;

(B) performing transmission sorting on the M asynchronous packets, comprising:
   (a) judging whether a length of an $i^{th}$ asynchronous packet of the M asynchronous packets is smaller than or equal to the remained bandwidth, wherein i is a natural number with a start value equal to 1 and is smaller than or equal to M;
   (b) arranging the transmission operation of the $i^{th}$ asynchronous packet in the asynchronous transmission period when the length of the $i^{th}$ asynchronous packet is smaller than or equal to the remained bandwidth, and subtracting a first packet length from the remained bandwidth to update the remained bandwidth, and then jumping to step (d);
   (c) jumping to the step (d) when the length of the $i^{th}$ asynchronous packet is greater than the remained bandwidth; and
   (d) ascending i by 1 and judging whether i is greater than M, wherein the operation (a) is repeated if i is greater than M, and the process (B) ends if i is not greater than M; and (C) ascending j by 1 and judging whether j is greater than N, wherein the operation (A) is repeated if j is not greater than N, and the operations (A) to (C) end if j is greater than N.

4. The network transceiver according to claim 1, wherein the transmission unit further comprises:
   an isochronous transmission logic circuit for outputting the isochronous packets in the isochronous transmission period.

5. The network transceiver according to claim 4, wherein the transmission unit further comprises:
   a demultiplexer circuit for providing the asynchronous packets and the isochronous packets, provided by the exchanging unit, to the asynchronous transmission logic circuit and the isochronous transmission logic circuit, respectively.

6. The network transceiver according to claim 4, wherein the transmission unit further comprises:
   an output multiplexer circuit for outputting the isochronous packets and the asynchronous packets in the isochronous transmission period and the asynchronous transmission period, respectively, and further for providing the remained bandwidth information to indicate a remained bandwidth of the asynchronous transmission period.

7. A bandwidth management method, applied to a network transceiver, for transmitting a plurality of asynchronous packets and a plurality of isochronous packets, the bandwidth management method comprising the steps of:
   dividing a transmission period into an asynchronous transmission period and an isochronous transmission period;
   outputting the isochronous packets in the isochronous transmission period;
   determining a remained bandwidth of the asynchronous transmission period according to remained bandwidth information;
   determining a transmission order of each of the asynchronous packets according to packet length information of each of the asynchronous packets; and
   outputting the asynchronous packets in the asynchronous transmission period according to a transmission priority order of each of the asynchronous packets;
   wherein the step of outputting the asynchronous packets comprises:
   classifying the asynchronous packets into N packet subsets according to a plurality of packet length conditions, wherein the N packet subsets respectively correspond to N transmission orders;
   storing the N packet subsets to a plurality of temporarily stored queues, respectively; and
   sequentially registering the asynchronous packets of the N packet subsets into a transmission data bandwidth according to the N transmission orders.

8. The method according to claim 7, wherein the step of classifying the asynchronous packets into the N packet subsets comprises:
   classifying the asynchronous packets into the N packet subsets according to transmission-priority-order label information of each of the asynchronous packets; and
   arranging a transmission operation of each of the asynchronous packets of the N packet subsets.

9. The method according to claim 8, wherein arranging the transmission operation of each of the asynchronous packets of the N packet subsets comprises:
   (A) selecting a packet subset of the N packet subsets with a corresponding $j^{th}$ transmission order, the packet subset of the $j^{th}$ transmission order comprising M asynchronous packets, wherein j is a natural number with a start value of 1 and is smaller than or equal to N, and M is a natural number;
   (B) performing transmission sorting on the M asynchronous packets, comprising:
      (a) judging whether a length of an $i^{th}$ asynchronous packet of the M asynchronous packets is smaller than or equal to the remained bandwidth, wherein i is a natural number with a start value equal to 1 and is smaller than or equal to M;
      (b) arranging the transmission operation of the $i^{th}$ asynchronous packet in the asynchronous transmission period when the length of the $i^{th}$ asynchronous packet is smaller than or equal to the remained bandwidth, and subtracting a first packet length from the remained bandwidth to update the remained bandwidth, and then jumping to step (d);
      (c) jumping to the step (d) when the length of the $i^{th}$ asynchronous packet is greater than the remained bandwidth; and
      (d) ascending i by 1 and judging whether i is greater than M, wherein the operation (a) is repeated if i is greater than M, and the process (B) ends if i is not greater than M; and
   (C) ascending j by 1 and judging whether j is greater than N, wherein the operation (A) is repeated if j is not greater than N, and the operations (A) to (C) end if j is greater than N.

* * * * *